US007249710B2

(12) United States Patent
Wang et al.

(10) Patent No.: US 7,249,710 B2
(45) Date of Patent: Jul. 31, 2007

(54) METHOD OF DYNAMIC ICONS AND LABELS SHOWING STATUS OF THE MEMORY CARD IN A CARD READER

(75) Inventors: Brandon Wang, Hsinchu (TW); Ryan Chen, Chang Hua Hsien (TW); Tsung-Yi Tseng, Ping Tung Hsien (TW); Li-Hsin Chuang, Hsinchu (TW)

(73) Assignee: Integrated Circuit Solution Inc., Hsinchu (TW)

( * ) Notice: Subject to any disclaimer, the term of this patent is extended or adjusted under 35 U.S.C. 154(b) by 0 days.

(21) Appl. No.: 10/893,303

(22) Filed: Jul. 19, 2004

(65) Prior Publication Data

US 2005/0045721 A1 Mar. 3, 2005

(30) Foreign Application Priority Data

Jul. 18, 2003 (TW) .............................. 92119700 A

(51) Int. Cl.
*G06K 7/08* (2006.01)

(52) U.S. Cl. ....................... 235/451; 235/494; 235/380

(58) Field of Classification Search ................ 235/451, 235/380, 492, 482, 483, 375, 487; 710/301; 345/810; 711/163
See application file for complete search history.

(56) References Cited

U.S. PATENT DOCUMENTS 5,165,043 A * 11/1992 Miyahara et al. ........... 235/380
6,168,077 B1 * 1/2001 Gray et al. ................. 235/375
6,438,638 B1 * 8/2002 Jones et al. ................. 710/301
6,446,177 B1 * 9/2002 Tanaka et al. .............. 711/163
6,776,348 B2 * 8/2004 Liu et al. .................... 235/492
7,014,121 B2 * 3/2006 Chang et al. ............... 235/492
2003/0058284 A1 * 3/2003 Toh et al. ................... 345/810
2004/0068601 A1 * 4/2004 Kang et al. ................. 710/301
2004/0153638 A1 * 8/2004 Tseng et al. .................... 713/1
2004/0212831 A1 * 10/2004 Imai et al. ................. 358/1.16
2004/0230789 A1 * 11/2004 Lee .............................. 713/2
2005/0023339 A1 * 2/2005 Uno .......................... 235/375

FOREIGN PATENT DOCUMENTS

DE 10139889 C1 * 1/2003
JP 2003-185697 6/2003

* cited by examiner

*Primary Examiner*—Steven S. Paik
(74) *Attorney, Agent, or Firm*—Troxell Law Office, PLLC

(57) ABSTRACT

A method of about using icons and labels on window operation platform to express status of the memory card in a card reader having multiple slots is disclosed. The AP (application software) timely sends an inquiring packet to the reader. The card reader inspects the card status and then in response to the host with a responsive packet to the host. The AP then updates the icon and label in accordance with the responsive pocket, wherein the inquiring packet and responsive packet are through SCSI Pass through mode.

7 Claims, 1 Drawing Sheet installed an AP — 100
AP( resident program) sends inquiry-packet to card reader — 110
generate an responsive packet according to the status of the card reader to the host — 120
AP according to responsive packet generate icons and labels — 130
AP sends inquiry-packet periodically to the card reader — 140
Does any variation of the memory card in the slots occur ? — 150 (No → 140; Yes)
card reader generate an updated responsive packet — 160
Icons are updated by AP — 170

| 0 ~ 3 bit | 4 ~ 7 bit | 8 ~ 11 bit | 12 ~ 15 bit |
|---|---|---|---|
| vender signature | slot operation | card type | card status |

METHOD OF DYNAMIC ICONS AND LABELS SHOWING STATUS OF THE MEMORY CARD IN A CARD READER

FIELD OF THE INVENTIONS

This invention relates to a method of about using dynamic icons and labels to express or show the status of a card reader in real time especially, for those using highlight or bright versus dark color to express status of at least one flash-memory card(s) in slot(s) of an USB card reader.

BACKGROUND OF THE INVENTION

With the progress of the semiconductor manufacturing technique, the flash memory card is known to have low price per unit memory cell than ever before. As a portable device, the flash memory card not only has characters of mini-size and low weight but also without read-head vibration problem as conventional disk driver has. The flash memory card is thus the one of the most hit electronic merchandise for memory expansion usage of digital still camera, MP3 player, pen drive, and personal digital secretary assistance. A user utilizes the flash memory card to store the image data or sound recorded data or other digital information he desired in outdoor, thereafter, he can easily access the data that he stored in the flash memory card just by applying the card reader while he comes to the office or home. The flash memory card can be refreshed just by doing the file deletion or memory card formatting.

However, the specifications of the flash memory card are not unified but to variety from one main manufacturer to another. There are at least 6 types of memory cards being hit in the market, examples are CF type I/II, Memory Stick (MS), Multimedia Card (MMC), Secure Media Card (SD), Smart Media Card (SMC), and XD-Picture Card. Accordingly, to adapt the variety of card types, the card-readers are variety to satisfy the various requirements of users. Typically, the types of 2 in 1 (two slots in one card reader), 3 in 1, 4 in 1, or 6 in 1 of card-readers are very common.

In responsive to the popularity and common of the USB devices, nowadays, the basic input/output systems for personal computers are almost all supporting the booting function. Typically, those kinds of the USB devices are used for data storage including USB card reader, and pen-drive, USB-hard disk driver, USB-floppy driver. However, no matter what kinds of the popular operation systems are, for example, WIN 98, WIN 2000, NT4, Win XP, or Linux, most of them shown only one icon to show the present of a card reader, even more than one memory cards are inserted. Some of the card readers show more icons on desktop so that each corresponds to one slot and is labeled by one letter. Even though the status thereof is not shown. User can not acquire the memory card(s) presented information just from the labels or icons shown. Usually, morn than one try is demanded.

Hence, an object of the present invention is to provide a method. In the method, the flash card(s) inserted into the slot(s) is detected and the statuses are provided.

SUMMARY OF THE INVENTION

A method of about using icons and labels on window operation platform to express status of the memory card in a card reader having multiple slots is disclosed. The AP (application software) timely sends an inquiring packet to the reader. The card reader inspects the card status and then in response to the host with a responsive packet to the host. The AP then updates the icon and label in accordance with the responsive pocket. Preferably, the color of the icon is highlighted or changed to distinguish the slot with a flash memory card inserted from without. Worthwhile, the inquiry-packet and responsive packet are through SCSI Pass through mode.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE INVENTION

Figures 1, 2:
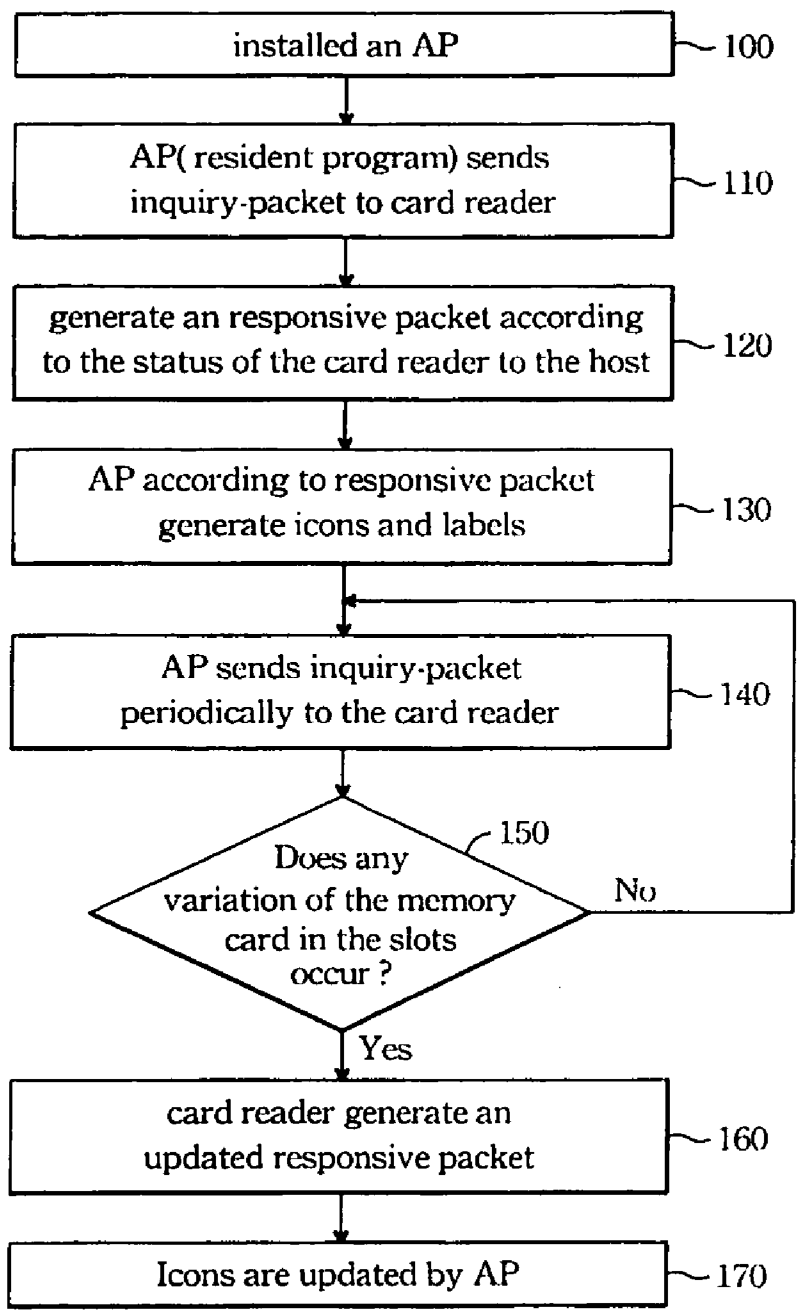
FIG. 1 shows a flow chart in accordance with the present invention
FIG. 2 shows the format of the responsive packet in accordance with the present invention.

According to the aforementioned descriptions in the background of the invention, most brands of the card readers even if more than one flash memory cards are inserted, the operation system of the personal computer shows only one disk driver logic number to represent one card reader. User can not obtain the information of card status just from the label or icon presented on the windows display. Even though some of brands of card readers provides more icons and have one icon to represent one slot, they do not show how many and/or which of the memory cards are inserted. An object of the invention is to provide a method which can solve above inconvenient.

Referring to a flow chart shown in FIG. 1, it shows steps 100 to 170. In step 100, an application-software is provided by vender, which manufactures the card reader in accordance with the present invention. The user installs the application-software and the operation system loaded the application-software to serve as a resident program.

Thereafter, as is shown in step 110, the resident program sent an inquiry-packet (or called inquiring packet) to the card reader over an USB cable or USB connector. After receiving the inquiry-packet, the firmware of the card reader determining if the command belongs to a standard request or a vender request in accordance with the command list of USB protocol. According to the present invention, the forgoing inquiry-packet is a vender request. The firmware generates a responsive packet which reports the card status of individual card to the operation system according to the flash memory card type and if it is inserted in the slot or not. An exemplary format of the responsive packet is shown in FIG. 2. The bit 0 to 3 is for vender identification code. The bit 4 to bit 7 depicts the operation mode. The bit 8 to bit 11 depicts the card type. The bit 12 to bit 15 depicts the card inserted information of each slot.

As is shown in step 130, after the responsive packet is received by the host, the resident program then provides the information according to the contents of the responsive packet to the operation system and provides the corresponding icons or labels on the desktop. Preferably, each slot is represented by an icon and when the flash memory card is inserted thereto, the corresponding color of the icon is highlighted and/or changed.

In step 140, an optional step, an inquiry-packet is sent by the resident program to the card reader periodically. The card reader receives the inquiry-packet, and then the card reader detects if any memory card is added or removed, as is shown in step 150. Alternatively, the card reader dynamically detects the slots without receiving the inquiry-packet. If occurrence of the any variation of the memory cards in the slots are true, the card reader, and then responses an updated responsive packet again as is shown in step 160. In step 170, the icons are presented with corresponding colors or highlight thereof by the resident program in accordance with the contents of the updated responsive packet. The period of time of the inquiry-packet sent can be of about 1 second or longer such as 2 second once.

Worthwhile the interface used for application software and card reader to send inquiry-packet or responsive packet is by means of SCSI (small computer system interface) pass through (abbreviate as SPT). The SPT is generally an interface used in application to send SCSI commands to SCSI device. However, the SPT can still provide a passage between the resident program on operation system and card reader to transmit or receive commands over the stack of the USB driver.

As is understood by a person skilled in the art, the foregoing preferred embodiment of the present invention is an illustration of the present invention rather than limiting thereon. It is intended to cover various modifications and similar arrangements included within the spirit and scope of the appended claims, the scope of which should be accorded the broadest interpretation so as to encompass all such modifications and similar structure.

What is claimed is:

1. A method of showing status of memory card(s) in a card reader on a windows desktop, said method comprising the steps of:

providing a card reader having multiple slots provided for flash memory cards thereto insert and being connected to a host;

providing a resident program loaded by said host, said resident program sent an inquiring packet to said card reader;

replying a responsive packet to said host by a firmware of said card reader in response to said inquiring packet according to the memory card type and if any one of the slots is inserted with a corresponding flash memory card; and showing icons on said windows desktop according to said responsive packet;

sending an updated responsive packet by said card reader if any one of said slots having a corresponding flash memory card is being added or removed therefrom; and updating said icons by said resident program in accordance with said updated responsive packet.

2. The method of claim 1 wherein said host and said card reader are connected through an USB cable or an USB connector.

3. The method of claim 1 wherein responsive packet comprises operation mode and vender identification number.

4. The method of claim 1 further comprises sending an inquiring packet periodically to said card reader by said resident program.

5. The method of claim 1 wherein said step of showing icons by highlighting the icon or changing the color of the icon or changing the pattern of the icon to distinguish those of said slots inserted with a corresponding flash memory card from without.

6. The method of claim 1, wherein said inquiring packet and responsive packet is sent by SCSI (small computer system interface) pass through.

7. The method of claim 1, wherein said responsive packet comprises vender identification code, operation mode, card type information and card inserted information of each slot.

* * * * *